Patented Apr. 28, 1936

2,038,764

UNITED STATES PATENT OFFICE

2,038,764

SYNTHETIC RESIN

George W. Seymour, Cumberland, Md., assignor to Celanese Corporation of America, a corporation of Delaware No Drawing. Application April 16, 1932, Serial No. 605,789

7 Claims. (Cl. 260—2)

This invention relates to the preparation of a synthetic resin from an ortho cresol or a mixture of cresols and a ketone, and also to coating or plastic compositions containing derivatives of cellulose and particularly organic derivatives of cellulose.

An object of my invention is to prepare a synthetic resin that is compatible with derivatives of cellulose, and therefore suitable for use in films, lacquers or other coating compositions or plastics containing such derivatives of cellulose. A further object of my invention is to provide a suitable resin for lacquers or plastic compositions containing derivatives of cellulose, which resin is compatible with the other constituents of the lacquers and which produces clear solutions which upon drying form films that are adherent, tough and hard and water-resistant.

The preparation of a lacquer containing organic derivatives of cellulose such as cellulose acetate as the main constituent of the lacquer base, which lacquer is to be applied to a hard, smooth surface presents many difficulties. This is due primarily to the fact that films from lacquers containing cellulose acetate as the sole constituent of the lacquer base do not adhere to smooth surfaces. When attempts are made to incorporate natural gums or resins in the lacquer containing cellulose acetate in order to impart the necessary adhesive qualities to the film produced from it, both the lacquer and the film produced therefrom become cloudy and unhomogeneous.

I have found that synthetic resins produced by the condensation of a ketone with ortho cresol or a mixture of cresols in the presence of a suitable catalyst are compatible with cellulose acetate, and that when added to lacquers containing cellulose acetate they form clear solutions that upon drying produce clear, hard and tough and firmly adherent films, which are resistant to water.

In accordance with my invention, I prepare special synthetic resins formed by the reaction of a ketone with either ortho cresol or a mixture of cresols containing the ortho cresol in the presence of a suitable catalyst, preferably a strong acid such as hydrochloric, sulfuric, or phosphoric acid. These synthetic resins are then used for making a lacquer or plastic composition which contains one or more derivatives of cellulose and a volatile solvent. The lacquer may contain also one or more natural or semi-synthetic resins or gums, one or more plastifiers or softening agents, medium and/or high boiling point solvents and preferably, but not necessarily, some pigments and/or dyes.

Solutions thus formed may be employed as a lacquer or coating composition for metal, glass or other surfaces and may be used for making photographic or other films. Artificial yarns may be formed by extruding the solution containing the derivative of cellulose and the special resin through the orifices of a spinneret, either into a heated evaporative atmosphere as in dry spinning, or into a precipitating bath as in wet spinning. The solution may also be employed as an adhesive, and is particularly useful in this connection for making shatterless glass by causing celluloid sheets to adhere to surfaces of sheets of glass between which they are placed.

The plastic composition containing derivatives of cellulose and the special resin may be worked into sheets which may also be used for laminated glass, and also may be worked into blocks or articles in any known manner.

The derivative of cellulose that may be used for making the solutions for coating or plastic compositions comprises any suitable derivative, such as cellulose nitrate or organic derivatives of cellulose. Examples of organic derivatives of cellulose are organic esters of cellulose such as cellulose acetate, cellulose formate, cellulose propionate and cellulose butyrate or cellulose ethers such as ethyl cellulose, methyl cellulose and benzyl cellulose.

The low boiling point solvent that may be employed may be one or a mixture of two or more of the following: Acetone, ethylene, formal, alcohol, benzene or ethylene dichloride. Examples of medium and/or high boiling point solvents are ethyl acetate, ethyl lactate, formal glycerol, tetrachlorethane, benzyl alcohol or diacetone alcohol. Of course it is understood that the choice of the solvents depends on the solubility characteristics of the particular derivative of cellulose employed. Examples of suitable plastifiers are diphenylol propane, triacetin, dibutyl tartrate, diethyl phthalate, dimethyl phthalate, toluene sulfonamid, mono methyl xylene sulfonamid. If desired, fire retardants may be added, particularly the very effective bromine derivatives of organic compounds, such as brominated tricresyl phosphate. The pigments or dyes that may be used may be those ordinarily employed in the paint or lacquer industry.

Of the natural gums or resins that may be added, the following may be mentioned: manila, accaroides, pontianak, kauri, dammar, rosin and shellac. The semi-synthetic resin, ester gum, which is the glycerol ester of rosin may be also added. If desired, synthetic resins, other than the special cresol-ketone resin may be employed in conjunction therewith, and examples of these are the fusible and soluble phenol-formaldehyde or diphenylol propane-formaldehyde resins preferably prepared in the presence of acid catalysts.

The special resin made by and employed in this invention is prepared by the condensation of a ketone, such as acetone, methyl ethyl ketone or diethyl ketone with either pure ortho-cresols or a mixture of the three cresols, namely, ortho-, para- and meta-cresol, such as occurs in the ordinary commercial cresol. The pure para-cresol or the pure meta-cresol may not be employed in this invention, since resin formed by the condensation of either of these cresols with acetone are not compatible with cellulose acetate.

The ortho-cresol or mixture of cresols may be condensed with the ketone in the presence of a strong acid such as hydrochloric acid as catalyst. The condensation may be carried out at ordinary or slightly above ordinary room temperatures say 30 to 40° C., for a period of time, preferably not substantially exceeding 6 days, or by heating the reactants under reflux at temperatures of 60 to 70° C. for a period of about 5 to 6 hours. The proportions of reactants employed are preferably on the order of one molecular proportion of acetone to two molecular proportions of cresol.

The following are two specific examples of making the resin.

*Example A*

Two molecular proportions of either commercial cresol containing a preponderance of ortho-cresol, or pure ortho cresol are mixed in a closed vessel with one molecular proportion of acetone. Dry HCl gas is passed into the mixture at room temperatures so as to saturate the same with hydrogen chloride which requires above five hours. The mixture is then permitted to stand in the closed vessel for five days at 30 to 40° C. Thereupon the reaction mixture is steam distilled or distilled under vacuum until neutral and free of cresol. The resulting resin is then fused at 150° C. to drive off water. This resin is hard, lightfast, and is compatible with cellulose acetate.

*Example B*

The process of Example A is carried out with the exception that instead of causing the reaction of the cresol with the acetone to take place at 30 to 40° C. for five days, the mixture of cresol, acetone and HCl are refluxed at 60 to 70° C. for about 5½ hours. A resin similar to that obtained by the process of Example A is obtained.

The following examples serve to illustrate coating or plastic compositions made in accordance with this invention.

*Example I*

A coating composition containing the resin may be made as follows:

| | Parts by weight |
|---|---|
| Cellulose acetate | 10 |
| Synthetic resin | 1 to 20 |
| Acetone | 100 |

*Example II*

The following is another example of coating composition:

| | Parts by weight |
|---|---|
| Cellulose acetate | 10 |
| Synthetic resin | 1 to 20 |
| Acetone | 50 |
| Benzene | 25 |
| Alcohol (ethyl or denatured) | 25 |
| Diacetone alcohol | 20 |

*Example III*

The following is an example of a solution that is suitable as an adhesive, and is particularly useful for causing a sheet of celluloid to adhere to surfaces of sheets of glass, cardboard, asbestos, metal, etc.:

| | Parts by weight |
|---|---|
| Cellulose acetate | 20 |
| Synthetic resin | 25 |
| Acetone | 60 |
| Ethyl acetate | 30 |
| Ethyl lactate | 10 |

*Example IV*

Following is an example of a plastic composition:

| | Parts by weight |
|---|---|
| Cellulose acetate | 100 |
| Synthetic resin | 40 |
| Monomethyl xylene sulfonamid | 10 |
| Alcohol | 50 |
| Benzene | 50 |

*Example V*

The following is an example that may be employed for making artificial yarn by extruding through the orifices of a spinneret into a heated, evaporative atmosphere:

| | Parts by weight |
|---|---|
| Cellulose acetate | 100 |
| Synthetic resin | 20 |
| Acetone | 400 |

*Example VI*

The following is a formula for pigmented lacquer:

| | Parts by weight |
|---|---|
| Cellulose acetate | 20 |
| Synthetic resin | 25 |
| Diphenylol propane | 10 |
| Pigment | 10 |
| Acetone | 100 |
| Ethyl acetate | 20 |
| Benzene | 20 |
| Toluene | 10 |
| Ethyl lactate | 20 |

*Example VII*

The following examples are given to illustrate the use of a synthetic resin in connection with cellulose nitrate for various purposes: (a) Coating composition may contain:

| | | |
|---|---|---|
| Cellulose nitrate | kilograms | 6 |
| Camphor | do | 2 |
| Diethyl phthalate | do | 2 |
| Synthetic resin | do | 10 |
| Benzene | liters | 20 |
| Alcohol | do | 20 |
| Butyl alcohol | do | 20 |
| Butyl acetate | do | 20 |
| Ethyl acetate | do | 30 |

(b) An adhesive solution suitable for use in the preparation of laminated glass may contain:

| | | |
|---|---|---|
| Cellulose nitrate | kilograms | 0.4 |
| Camphor | do | 0.1 |
| Dibutyl phthalate | do | 0.1 |
| Synthetic resin | do | 1.0 |
| Benzene | liters | 29 |
| Alcohol | do | 10 |
| Butyl alcohol | do | 20 |
| Butyl acetate | do | 20 |
| Ethyl acetate | do | 30 |

In the foregoing examples, the cellulose acetate may be replaced by cellulose propionate, cellulose butyrate, etc. Either the cellulose acetate or the cellulose nitrate may be replaced by cellulose ethers.

It is to be understood that the foregoing detailed description is given merely by way of illustration, and that many variations may be made therein, without departing from the spirit of my invention.

Having described my invention, what I claim and desire to secure by Letters Patent is:

1. A synthetic resin formed by the reaction of acetone with ortho-cresol.

2. A synthetic resin formed by the reaction of a ketone with a substantially pure ortho-cresol.

3. A synthetic resin formed by the reaction of acetone with a substantially pure ortho-cresol.

4. Method of preparing a synthetic resin, comprising causing a ketone to react with ortho-cresol and maintaining the reactants under reaction conditions until resinification takes place.

5. Method of preparing a synthetic resin, comprising causing a ketone to react with substantially pure ortho-cresol and maintaining the reactants under reaction conditions until resinification takes place.

6. Method of preparing a synthetic resin, comprising causing acetone to react with ortho-cresol and maintaining the reactants under reaction conditions until resinification takes place.

7. Method of preparing a synthetic resin, comprising causing acetone to react with ortho-cresol in the presence of a strong acid as catalyst and maintaining the reactants under reaction conditions until resinification takes place.

GEORGE W. SEYMOUR.